Sept. 6, 1927.
G. W. ELSEY
1,641,418
ENGINE STARTING APPARATUS
Filed May 6, 1926
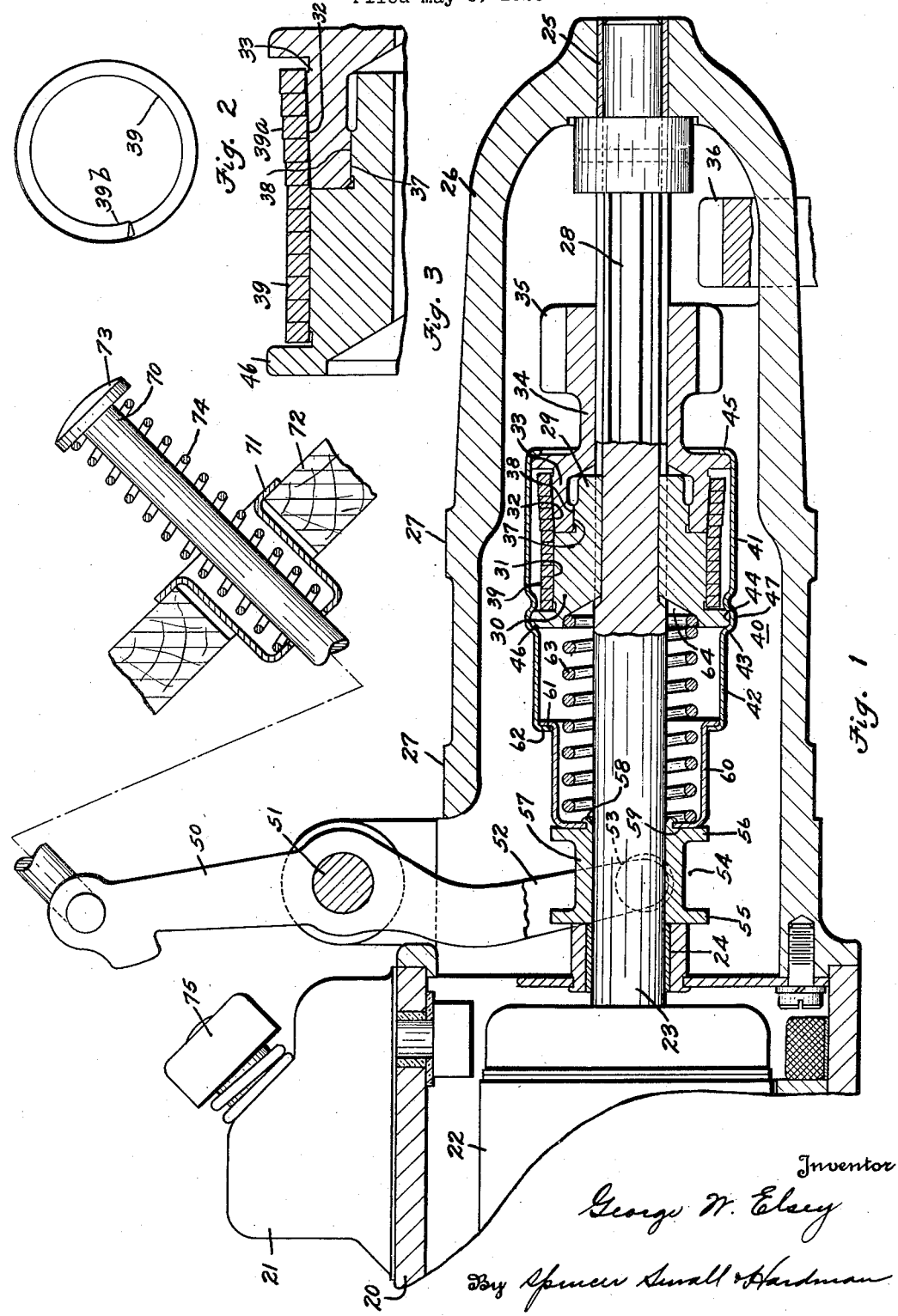

Patented Sept. 6, 1927.

1,641,418

UNITED STATES PATENT OFFICE.

GEORGE W. ELSEY, OF ANDERSON, INDIANA, ASSIGNOR, BY MESNE ASSIGNMENTS, TO DELCO-REMY CORPORATION, OF DAYTON. OHIO, A CORPORATION OF DELAWARE.

ENGINE-STARTING APPARATUS.

Application filed May 6, 1926. Serial No. 107,109.

This invention relates to apparatus for starting an internal combustion engine, and particularly to the type of engine starter which includes an electric motor having a shaft connected through a one-way engaging clutch with a pinion adapted to move endwise into engagement with the gear of an engine to be started.

It is among the objects of the invention to simplify the construction and reduce the cost of manufacture of engine starting apparatus of the type referred to.

Further objects and advantages of the present invention will be apparent from the following description, reference being had to the accompanying drawings, wherein a preferred form of the present invention is clearly shown.

In the drawings:

Fig. 1 is a fragmentary longitudinal sectional view of the engine starting apparatus embodying the present invention.

Fig. 2 is an end view of the clutch spring before being assembled with the clutch drums.

Fig. 3 is a fragmentary longitudinal sectional view of the clutch on a larger scale than Fig. 1.

In the drawing, 20 designates the field frame of an electric motor which is controlled by a switch 21 mounted on the frame, and which includes an armature 22 rotatable upon a shaft 23. The shaft 23 is supported by a bearing (not shown) attached to the field frame 20, and by bearings 24 and 25 which are provided by a gear housing member 26. The housing member 26 is provided with finished cylindrical surfaces 27 which are adapted to be received by a cylindrical aperture within the frame of the engine (not shown) for the purpose of supporting the gear housing 26.

The shaft 23 is provided with splines 28 which are drivingly connected with the internally-splined hub 29 of a clutch drum 30 having a cylindrical clutching surface 31 coaxial with the slightly tapered conical clutching surface 32 of a clutch drum 33 which is formed integrally with the hub 34 of a pinion 35 which is movable endwise along the shaft 23 into engagement with a gear 36 connected with the engine to be started. The diameter of the left end of surface 32 is the same as the diameter of the surface 31. The hub 29 is provided with an accurately-finished surface 37 which has a running fit with a finished surface 38 provided on the interior of the clutch drum 33. When these surfaces are engaged and the clutch drums abut, as shown in the drawing, the clutching surfaces 31 and 32 will be located in alignment so as to receive a clutch spring 39 having the internal periphery of its turns ground to substantially true cylindrical form and frictionally engageable with the clutch-drum surfaces 31 and 32.

The clutch members are maintained in assembled relation by means including a tube 40 having portions 41 and 42 of different diameters, thereby defining a shoulder 43. Before the portion 41 is provided with the annular groove 44 and the inwardly-extending flange 45, the clutch members are assembled within the tube 40 and are located so that a flange 46 provided by the clutch member 30 will abut the shoulder 43. The metal is deformed to provide an annular bead 47 which engages the flange 46 in order that the clutch member 30 will be permanently assembled to the tube 40, the flange 46 being received by the groove 44 which is defined by the shoulder 43 and the bead 47. The tube portion 41 is provided by a spinning operation with the flange 45 which prevents separation of the clutch member 33 from the member 30 but permits the clutch member 33 to rotate freely relative to the member 30. The space between the spring 39 and the tube portion 41 may be packed with grease before the member 33 is permanently assembled in position, in order to provide a supply of lubricant for the clutch which will be sufficient during the normal life of the clutch. The tube 41, therefore, acts as a lubricant housing and prevents the admission of dirt and other foreign substances to the clutch spring.

The clutch and pinion are moved endwise along the shaft 23 by means including a lever 50 which is pivotally mounted upon a rod 51 supported by the gear housing 26. The lower end of the lever is bifurcated to provide arms 52, each of which carries a stud or roller 53 received by the groove 54 which is defined by flanges 55 and 56 of a sleeve 57 slidable along the shaft 23. The sleeve 57 is attached by riveting or swedging at 58 to the inwardly-extending flange 59 of a tube 60 having an outwardly-extending flange 61 which is received by the tube 42. The tube 42 has an inwardly-extending flange 62 adapted to engage the flange 61 in order to prevent separation of the sleeve 57 from the clutch. In order to transmit motion yieldingly from the sleeve 57 to the clutch, a spring 63 is located between the flange 59 and the clutch drum 30, the right-hand end of the spring being received by a recess 64 provided in the member 30.

The lever 50 is operated by a pedal rod 70 which extends through a cup member 71 mounted upon the floor-board 72 of an automotive vehicle. The rod is provided with a pedal 73, and a spring 74 is located between the cup 71 and the pedal 73 for the purpose of maintaining the starting apparatus in the position shown in the drawing.

To start an engine with the apparatus described, the pedal 73 is pressed downwardly in order to cause the lever 50 to move in a counterclockwise direction and the clutch members and the pinion 35 to move toward the right in the drawing in order to mesh the pinion with an engine gear 36. During this movement of the lever 50 it will engage the operating member 75 of the switch 21 in order to close the switch and to cause the motor to crank the engine through the clutch and gearing described.

The clutch spring 39 is coiled in such a manner that when the shaft 28 is rotated in engine cranking direction the spring 39 will contract to increase the frictional grip about the clutch drums in order to transmit the torque required to crank the engine. The spring 39 is initially cylindrically-helical, and its internal diameter is slightly less than the diameter of the drum surface 31. When the spring is assembled upon the clutch drums it will engage the drum surface 31 with relatively slight unit pressure, but the conical drum surface 32 will be engaged by the spring with greater unit pressure than exerted upon the surface 31. This effect is due to the fact that the width of the surface of contact of each spring coil engaging the drum surface 31 is the width of the cylindrically-helical surface with which the spring is initially provided, whereas the width of the surface of contact of each spring coil engaging the conical drum surface 32 is much narrower than the width of each coil—theoretically a helical line contact. Furthermore, the total pressure normally exerted by the coils embracing the conical surface 32 is greater than the total pressure exerted by the coils embracing the surface 31, since the former coils are wedgingly engaged by the conical surface 32 and are therefore expanded by the surface 32 increasingly proceeding toward the right hand end of the spring, as viewed in the drawing.

The right end turn of the spring 39 will exert the greatest pressure since it is expanded to the greatest degree.

When the shaft 28 begins to turn in the engine cranking direction, the spring coils embracing the drum 30 will be frictionally dragged ahead of the coils embracing the drum 33, since the pinion 35 is held stationary by the engine gear 36 and the spring coils embracing the drum 33 tend to remain stationary due to the relatively great friction between these coils and the drum 33. Engine cranking rotation of the shaft 28 tends to wind up the spring 39 and to cause it to contract about the clutch drums to the extent that the pressure between the spring and the drums is sufficient to transmit the torque required to crank the engine.

When the engine becomes self-operative, it will rotate the clutch member 33 through the gearing 36 and 35 at a speed greater than the motor will rotate it. The spring coils embracing the drum 33 will be dragged ahead of the spring coils embracing the drum 30, and the spring will be unwound and expanded in order to reduce the pressure exerted by the spring upon the drum 30 sufficiently to permit the spring to overrun the drum 30. Thus the pinion 35 will freely overrun the motor shaft 23 and the motor will not be rotated at an excessive speed after the engine becomes self-operative.

The coils which embrace the drum 30 are required to grip drivingly and to overrun the drum 30. The total initial pressure must not be so great as to prevent overrunning, yet this pressure must be increased sufficiently to transmit cranking torque. These conditions require the use of a certain number of turns of the spring to engage the drum 30. The turns embracing drum 33 are not required to overrun said drum but only frictionally to grip it with pressure which is initially sufficient to anchor one end of the spring to the drum 33, and with pressure is finally sufficient to transmit cranking torque. Therefore the number of spring turns required to engage the drum 33 may be less than the number of turns required to engage the drum 30, because the total spring pressure exerted by the spring upon the drum 33 is subject to less variation than the total spring pressure exerted by the spring upon the drum 30. Another reason why the number of turns embracing the drum 33 can be less than the number of turns embracing the drum 30 is because the coefficient of friction between the turns embracing the drum 33 is greater than the coefficient of friction between the turns embracing the drum 30. In order that the clutch may overrun, the surface 31 must be lubricated. This cannot be done practically without also lubricating the surface 32. Since the unit pressure exerted by those coils embracing the surface 32 is greater than the unit pressure exerted by those coils embracing the surface 31, there will be less lubricant between the surface 32 and the spring than between the surface 31 and the spring. Hence the coefficient of friction between the spring and surface 32 will be greater than between the spring and surface 31, particularly since the oil film between the spring and surface 32 may be destroyed.

The result of this construction and arrangement is that the clutch may be made shorter and with less material than a spring clutch having both clutch drums cylindrical. It is of course obvious that the drums could be reversed. For example, the cylindrical drum could be attached to the pinion, and the conical drum could be splined to the motor shaft.

Motion is transmitted yieldingly from the lever 50 to the clutch member 30 by the spring 63 so that the motor switch 21 may be closed prior to meshing the pinion 35 with the engine gear 36 in case the pinion teeth abut the engine gear teeth before the pinion is meshed.

After the engine becomes self-operative, the operator may release the pedal 73 whereupon the spring 74 will cause the lever 50 to move clockwise into the position shown in the drawing. The pinion 35 will be withdrawn from engagement with the engine gear 36 by a non-yielding device which includes the tubular parts 42 and 60 which cooperate through the engagement of their respective flanges 62 and 61.

The clutch spring 39 may be caused to grip the clutch drum 30 sooner if its end portion 39$^b$ is bent slightly inwardly from the inner periphery of the clutch spring as shown in Fig. 2.

While the form of embodiment of the present invention as herein disclosed, constitutes a preferred form, it is to be understood that other forms might be adopted, all coming within the scope of the claims which follow.

What is claimed is as follows:

1. Engine starting apparatus comprising, in combination, a motor, a shaft operated by the motor, a clutch member drivingly connected with the shaft and slidable along the shaft, a clutch member slidable along the shaft and rotatable independently thereof, said clutch members having coaxial friction surfaces, a helical-coil spring adapted to frictionally engage said surfaces and to provide a one-way driving connection between said members, a pinion slidable along the shaft and connected with the second clutch member, a tubular member enclosing the clutch members and preventing separation of the clutch members while permitting relative rotation of said members, means for yieldingly moving the clutch members and pinion in a direction to mesh the pinion with an engine gear and including a sleeve slidable along the shaft and a spring surrounding the shaft and located between the sleeve and first clutch member, and means for non-yieldingly withdrawing the pinion from the engine gear and including said sleeve and two telescopically coacting tubular parts enclosing the second mentioned spring, one part being attached to said sleeve and the other being an extension of said tubular member, said tubular parts having coacting flanges limiting separation of said sleeve from said clutch members.

2. Engine starting apparatus according to claim 1, and in which the clutch members are provided with external, coaxial friction surfaces which are engaged by a clutch spring which surrounds said surfaces, and the tubular member cooperates with outwardly extending annular flanges provided respectively by said clutch members and including said clutch spring.

3. Engine starting apparatus according to claim 1, and in which the clutch members are provided with external, coaxial friction surfaces which are engaged by a clutch spring which surrounds said surfaces, and the first mentioned clutch member is provided with an outwardly extending annular flange which is received by a groove in the tubular member intermediate the ends thereof.

4. Engine starting apparatus according to claim 1, and in which the clutch members are provided with external, coaxial friction surfaces which are engaged by a clutch spring which surrounds said surfaces, and the tubular member is connected intermediate its ends with the first mentioned clutch member and is provided with an inwardly extending annular flange at each end, one flange cooperating with the second mentioned clutch member to prevent separation thereof from the first clutch member, and the other flange cooperating with an outwardly extending annular flange provided at one end of the tubular part which is attached to the slidable sleeve and which is telescopically received by said tubular member.

5. Engine starting apparatus comprising, in combination, a motor, a shaft operated by the motor, a pinion adapted to engage a gear connected with the engine to be started, and a one-way clutch for connecting the shaft with the pinion and including abutting coaxial friction clutch drums, one having a cylindrical surface and the other a conical surface, abutting edges of said drum surfaces being substantially the same in diameter, and a coiled spring normally in frictional engagement with the drums and wedgingly engaged by the conical surface, said spring being free of positive connection with the drum.

6. Engine starting apparatus such as defined by claim 5 in which the width of surface of contact between the spring and the conical surface is less than the width of the surface of contact between the spring and the cylindrical surface, for the purpose specified.

7. Engine starting apparatus such as defined by claim 5 in which the spring is provided initially with a clutch drum engaging surface which is cylindrically helical and of substantial width, the surface of the spring which is wedgingly engaged by the conical surface being less in width than the width of said cylindrically-helical clutch drum engaging surface of the spring.

8. Engine starting apparatus such as defined by claim 5 having the clutch drums provided externally with abutting cylindrical and conical surfaces respectively, the diameter of the conical surface increasing from that of the cylindrical surface, and a single, initially cylindrically-helical spiral spring in frictional engagement with the drums.

9. Engine starting apparatus comprising in combination, a motor, a shaft driven by the motor, a pinion slidable along the shaft into engagement with the gear of an engine to be started, a one-way clutch having its driving member splinedly connected with the shaft and its driven member connected with the pinion, a manually operable member, a sleeve movable along the shaft and actuated by said member, a spring surrounding the shaft and located between the sleeve and clutch for transmitting motion from the sleeve to the clutch, and means surrounding the spring for limiting separation of the sleeve from the clutch while permitting the sleeve to approach the clutch.

10. Engine starting apparatus according to claim 10 in which the means limiting the separation of the sleeve from the clutch comprises telescopically engaging tubes surrounding the spring and attached respectively to the sleeve and clutch, the normally adjacent end portions of the tubes having cooperating flanges to limit separation of the tubes while permitting the sleeve to approach the clutch.

In testimony whereof I hereto affix my signature.

GEORGE W. ELSEY.